United States Patent
Yang et al.

(10) Patent No.: US 11,012,970 B2
(45) Date of Patent: May 18, 2021

(54) METHOD FOR PROCESSING RADIO FREQUENCY INTERFERENCE AND ELECTRONIC DEVICE

(71) Applicant: GUANGDONG OPPO MOBILE TELECOMMUNICATIONS CORP., LTD., Guangdong (CN)

(72) Inventors: Huai Yang, Guangdong (CN); Kui Fu, Guangdong (CN); Zaicheng Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/684,144

(22) Filed: Nov. 14, 2019

(65) Prior Publication Data

US 2020/0084745 A1    Mar. 12, 2020

Related U.S. Application Data

(63) Continuation of application No. PCT/CN2018/087816, filed on May 22, 2018.

(30) Foreign Application Priority Data

May 23, 2017   (CN) .......................... 201710369568.4

(51) Int. Cl.
*H04W 64/00* (2009.01)
*H04B 17/318* (2015.01)
(Continued)

(52) U.S. Cl.
CPC ........ *H04W 64/006* (2013.01); *H04B 17/318* (2015.01); *H04B 17/336* (2015.01); *H04W 52/0274* (2013.01)

(58) Field of Classification Search
CPC ......... H01L 2924/00014; H01L 23/552; H01L 2924/3025; H01R 13/5202; H01R 13/6473; H01R 13/6589; H01R 13/65918; H02M 1/44; H02M 1/32; H04W 4/20
See application file for complete search history.

(56) References Cited

U.S. PATENT DOCUMENTS

2008/0212724 A1    9/2008 Grabon et al.
2009/0325530 A1 *  12/2009 Sreerama ............. H04B 1/1027
                                                    455/296
(Continued)

FOREIGN PATENT DOCUMENTS

CN    1241855      1/2000
CN    101207457    6/2008
(Continued)

OTHER PUBLICATIONS

EPO, Office Action for EP Application No. 18804964.7, dated Mar. 2, 2020.
(Continued)

*Primary Examiner* — Kwasi Karikari
(74) *Attorney, Agent, or Firm* — Hodgson Russ LLP (57) ABSTRACT

A method for processing radio frequency (RF) interference and an electronic device are provided. The method includes the following. Functional components in operating status are determined while an RF signal received by an RF circuit has signal strength lower than a preset threshold. For each functional component, an interference intensity to the RF circuit and a distance to the RF circuit are acquired. For each functional component, an interference value is acquired according to the interference intensity and the distance. A target functional component with an interference value meeting a preset condition is disabled.

18 Claims, 5 Drawing Sheets

(51) Int. Cl.
*H04B 17/336* (2015.01)
*H04W 52/02* (2009.01)

(56) References Cited

U.S. PATENT DOCUMENTS

| | | | | |
|---|---|---|---|---|
| 2010/0056058 | A1* | 3/2010 | Tinsley | H04B 1/1027 |
| | | | | 455/63.1 |
| 2010/0197363 | A1 | 8/2010 | Sorensen et al. | |
| 2011/0256899 | A1* | 10/2011 | Khazei | H04B 15/00 |
| | | | | 455/517 |
| 2017/0034900 | A1* | 2/2017 | Strader | H05K 7/20436 |

FOREIGN PATENT DOCUMENTS

| | | |
|---|---|---|
| CN | 102083090 | 6/2011 |
| CN | 202275929 | 6/2012 |
| CN | 103762997 | 4/2014 |
| CN | 104602473 | 5/2015 |
| CN | 105979537 | 9/2016 |
| JP | 2008147897 | 6/2008 |
| KR | 101528693 | 6/2015 |
| WO | 2007124323 | 11/2007 |
| WO | 2012037643 | 3/2012 |

OTHER PUBLICATIONS

WIPO, ISR for PCT/CN2018/087816, dated Aug. 27, 2018.
SIPO, First Office Action for CN Application No. 201710369568.4, dated Oct. 19, 2018.
EPO, Communication for EP Application No. 18804964.7, dated Jan. 27, 2021.
IPI, Office Action for In Application No. 201917047104, dated Mar. 15, 2021.

* cited by examiner

METHOD FOR PROCESSING RADIO FREQUENCY INTERFERENCE AND ELECTRONIC DEVICE

CROSS-REFERENCE TO RELATED APPLICATIONS

This application is a continuation of International Application No. PCT/CN2018/087816, filed on May 22, 2018, which claims priority to Chinese Patent Application No. 201710369568.4, filed on May 23, 2017, the entire disclosures of which are incorporated herein by reference.

TECHNICAL FIELD

The present disclosure relates to the technical field of communication, and particularly to a method for processing radio frequency (RF) interference and an electronic device.

BACKGROUND

With the development of communication technologies, functions of mobile terminals such as smart phones are becoming diversified. The structure inside the mobile terminal is becoming increasingly complicated. Some components in the mobile terminal may interfere with each other.

Interference in radio frequency (RF) communication is a technical problem to be solved, which not only includes interference between components inside an RF system in a smart terminal, but also interference from other systems to the RF communication of the RF system. For example, when an incoming call arrives at the smart terminal, external interference sources such as a motor system, a camera system, a fingerprint system, and the like in the smart terminal may interfere with the receipt of a signal by the mobile terminal, which results in decreased strength of the signal received by the mobile terminal, thereby reducing the stability of the mobile terminal.

SUMMARY

According to implementations of the present disclosure, a method for processing RF interference is provided. The method includes the following.

A first component set is determined while an RF signal received by an RF circuit has signal strength lower than a preset threshold, where the first component set includes functional components in operating status. For each functional component, an interference intensity to the RF circuit and a distance to the RF circuit are acquired. For each functional component, an interference value is acquired according to the interference intensity and the distance. A target functional component with an interference value meeting a preset condition is determined from the first component set. The target functional component is disabled.

According to implementations of the present disclosure, an electronic device is provided. The electronic device includes an RF circuit, a processor, a control circuit, and multiple functional components.

The RF circuit is configured to emit and receive an RF signal. The multiple functional components are disposed in the electronic device. The control circuit is configured to control the RF circuit to receive the RF signal and acquire signal strength of the RF signal. The processor is coupled with the RF circuit, the control circuit, and the multiple functional components and configured to: determine, from the multiple functional components, functional components in operating status as a first component set, when the signal strength is lower than a preset threshold; for each functional component in the operating status, acquire an interference intensity to the RF circuit and a distance to the RF circuit, and for each functional component in the operating status, acquire an interference value according to the interference intensity and the distance; and control the control circuit to disable a target functional component, where the target functional component is determined from the first component set and has an interference value meeting a preset condition.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

For a more complete understanding of the present disclosure and advantages thereof, the following description will be made in conjunction with the accompanying drawings, where same reference numerals in the following indicate same parts.

DETAILED DESCRIPTION

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", and the like in the specification, the claims, and the accompany drawings of the present disclosure are used for distinguishing between different objects rather than describing a particular order. It should be understood that the objects described in this way may be exchanged when appropriate. In addition, the terms "include", "comprise", and "have" as well as variations thereof are intended to cover non-exclusive inclusion. For example, a process, a method, a system, a product, or a device including a series of steps or units is not limited to the listed steps or units, but can optionally include other steps or units not listed. Alternatively, other steps or units inherent to the process, the method, the product, or the device can be included either.

Implementations of the present disclosure provide a method for processing radio frequency (RF) interference and an electronic device, which are respectively illustrated in detail below.

The method for processing RF interference is provided, which is performed as follows.

A first component set is determined while an RF signal received by an RF circuit has signal strength lower than a preset threshold. The first component set includes functional components in operating status. For each functional component, an interference intensity to the RF circuit and a distance to the RF circuit are acquired, and for each functional component, an interference value is acquired according to the interference intensity and the distance. A target functional component with an interference value meeting a preset condition is determined from the first component set. The target functional component is disabled.

In some implementations, for each functional component, the interference intensity to the RF circuit is acquired as follows.

A channel currently occupied by the RF signal is determined. The interference intensity to the RF circuit in the channel is acquired.

In some implementations, for each functional component, the interference intensity to the RF circuit in the channel is acquired as follows.

A working frequency of the functional component and a frequency point corresponding to the channel are acquired. The interference intensity to the RF circuit in the channel is acquired according to a result of comparing the working frequency with the frequency point.

In some implementations, for each functional component, the distance to the RF circuit is acquired as follows.

Internal layout information of a terminal is acquired. The distance to the RF circuit is acquired according to the internal layout information.

In some implementations, for each functional component, the interference value is acquired according to the interference intensity and the distance as follows.

A first weight value corresponding to the interference intensity and a second weight value corresponding to the distance are acquired. A weighted parameter is acquired according to the interference intensity and the first weight value corresponding to the interference intensity as well as the distance and the second weight value corresponding to the distance. The interference value is acquired according to the weighted parameter.

In some implementations, the first weight value corresponding to the interference intensity and the second weight value corresponding to the distance are acquired as follows.

A target intensity interval that the interference intensity falls into is determined from multiple sample intensity intervals. An intensity level corresponding to the target intensity interval is acquired. The first weight value corresponding to the intensity level is acquired. A target distance interval that the distance falls into is determined from multiple sample distance intervals. A distance level corresponding to the target distance interval is acquired. The second weight value corresponding to the distance level is acquired.

In some implementations, the target functional component with the interference value meeting the preset condition is determined from the first component set as follows.

A functional component associated with an application running in a foreground is determined from the first component set. A second component set is obtained by deleting the associated functional component from the first component set. A preset number of target functional components are selected from the second component set in descending order of interference values, where each of the preset number of target functional components has an interference value greater than each unselected functional component in the second component set.

In some implementations, after the target functional component is disabled, the following is further performed.

Detect whether an RF signal currently received by the RF circuit has signal strength lower than the preset threshold. A compositive functional component in the operating status is determined while the RF signal currently received by the RF circuit has signal strength lower than the preset threshold, where the compositive functional component includes at least two sub-functional components with a same function. A sub-functional component with a maximum interference intensity to the RF circuit in the compositive functional component is disabled.

In some implementations, the sub-functional component with the maximum interference intensity to the RF circuit in the compositive functional component is disabled as follows.

For each sub-functional component in the compositive functional component, an interference intensity to the RF circuit is acquired. A target interference intensity with a maximum interference intensity value is selected from the interference intensities of all sub-functional components. A target sub-functional component corresponding to the target interference intensity is determined. The target sub-functional component is disabled.

Figure 1:
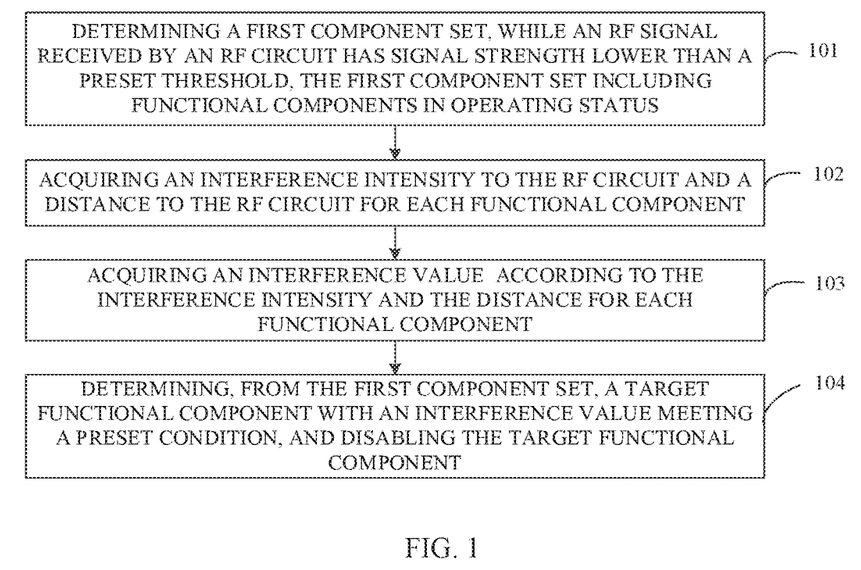
FIG. 1 is a schematic flow chart illustrating a method for processing radio frequency (RF) interference according to an implementation of the present disclosure.

As illustrated in FIG. 1, the method for processing RF interference begins at block 101.

At block 101, a first component set is determined while an RF signal received by an RF circuit has signal strength lower than a preset threshold, where the first component set includes functional components in operating status.

Figure 2:
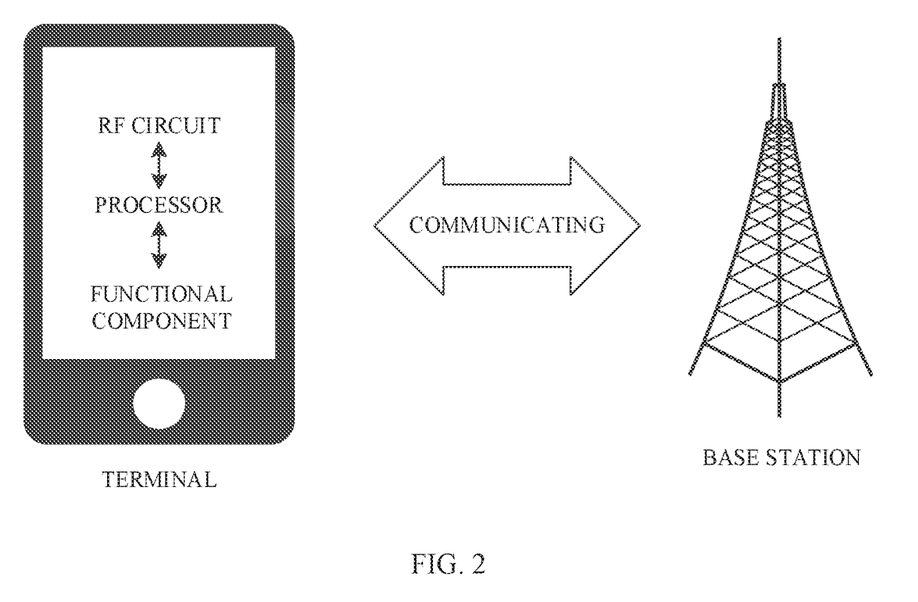
FIG. 2 is a schematic diagram illustrating an application scenario of a method for processing RF interference according to an implementation of the present disclosure.

FIG. 2 is a schematic diagram illustrating interaction between a terminal and a base station. The terminal includes an RF circuit, a processor, and functional components. The terminal communicates with the base station via the RF circuit. When the RF circuit in the terminal detects an RF signal from the base station, the RF signal is transmitted to the processor for processing. The processor in the terminal may detect signal strength of the RF signal received by the RF circuit. The signal strength of the RF signal received by the RF circuit may be that received by a signal receiver in the RF circuit.

In practice, when the terminal receives an RF signal from the base station, since another functional component currently running is in the operating status, a harmonic signal will be generated. When a frequency of the harmonic signal falls within a frequency band in which the RF circuit currently receives an RF signal, the functional component may produce signal interference to the RF circuit, thereby reducing the signal strength of the RF signal received by the RF circuit.

A preset threshold may be set for the RF signal received by the RF circuit, and the preset threshold can be stored in the terminal. The preset threshold represents signal strength. The preset threshold can be a signal strength value. For example, the preset threshold is −88 dBm (decibel milliwatt).

When an RF signal is received, signal strength of the RF signal currently received can be acquired by querying working parameters of the RF circuit. Thereafter, the signal strength acquired is compared with the preset threshold to determine whether the signal strength is lower than the preset threshold. When detecting that the signal strength is lower than the preset threshold, functional components in the operating status will be added into a first component set, in this way, the first component set includes the functional components in the operating status.

For example, if the signal strength of the RF signal obtained by the terminal is −90 dBm and the preset threshold is −88 dBm, the signal strength of the RF signal is lower than the preset threshold. Then, the terminal may acquire the first component set including the functional components in the operating status.

At block 102, for each functional component, an interference intensity to the RF circuit and a distance to the RF circuit are acquired.

In implementations of the present disclosure, the interference intensity refers to an intensity of interference to the RF circuit measured in an ideal condition. The ideal condition refers to a case where, except for a harmonic signal generated by a functional component in normal operating status, other conditions such as environment or location of the functional component remain unchanged. In practice, interference intensity of a functional component can be general data obtained by a person skilled in the art or a commodity manufacturer through multiple tests. Functional components of same specification have a same interference intensity to the RF circuit.

In some implementations, data on different functional components such as interference intensity and position relationships with the RF circuit inside the terminal may be stored locally in the terminal or stored in a network server, so that corresponding interference intensities and distances can be obtained according to the data. That is, for each functional component, the interference intensity to the RF circuit and the distance to the RF circuit can be acquired as follows.

A channel currently occupied by the RF signal is determined. The interference intensity to the RF circuit in the channel is acquired. Internal layout information of a terminal is acquired. The distance to the RF circuit is acquired according to the internal layout information.

Channels are different in frequency points on which signals can be transmitted, so different functional components have different interference in different channels. If a functional component has a same working frequency as a frequency point of a channel on which a signal is transmitted, the functional component may interfere with this channel. If the working frequency of the functional component is not used as the frequency point of the channel for signal transmission, the functional component may not interfere with the channel. Therefore, the working frequency of the functional component can be measured in advance, and the working frequency of the functional component and a frequency point corresponding to each channel can be stored in the terminal. In this way, the working frequency of the functional component can be compared with the frequency point of a current channel, thereby acquiring the interference intensity of the functional component to the RF circuit in the current channel.

In practice, the internal layout information may include a spatial location relationship diagram of all functional components inside the terminal, or may include location information (such as coordinates) of all functional components inside the terminal. Therefore, a distance between each functional component and the RF circuit can be obtained according to the layout information.

At block 103, for each functional component, an interference value is acquired according to the interference intensity and the distance.

In some implementations, the interference intensity and the distance can be set with different weight values. By contemplating the interference intensity and the distance, a functional component that strongly interferes with signals received by the RF circuit is determined as a target functional component.

That is, for each functional component, the interference value can be acquired according to the interference intensity and the distance as follows.

A first weight value corresponding to the interference intensity and a second weight value corresponding to the distance are acquired. A weighted parameter is acquired according to the interference intensity and the first weight value corresponding to the interference intensity as well as the distance and the second weight value corresponding to the distance. The interference value is acquired according to the weighted parameter.

In some implementations, interference intensities can be ranked and represented by values. The greater the value, the greater the interference intensity. For example, the interference intensities can be divided into multiple sample intensity intervals. Each sample intensity interval is correspondingly set with a different level, and the level is represented by a value. The greater the value, the greater the corresponding interference intensity. By comparing the interference intensity with the multiple sample intensity intervals, an intensity interval the interference intensity falls into can be determined, so that the level of the interference intensity (i.e., intensity level) can be obtained. Similarly, distances can be ranked and represented by values. The greater the value, the smaller the distance. For example, the distances can be divided into multiple sample distance intervals. Each sample distance interval is correspondingly set with a different level, and the level is represented by a value. The greater the value, the smaller the corresponding distance. By comparing the distance with the multiple sample distance intervals, a distance interval into which the distance falls can be determined, so that the level of the distance (i.e., distance level) can be obtained. Assuming that the interference intensity is at level 5, the corresponding first weight value is 60%, the distance is at level 4, and the corresponding second weight value is 400/%, the weighed parameter is: the value of the interference intensity*the first weight value+the value of the distance*the second weight value, that is, the weighted parameter is 4.6.

In some implementations, the weighted parameter can be directly used as the interference value.

In some implementations, the closer a functional component is to the RF circuit, the greater interference of the functional component is to the RF circuit. Therefore, when two or more functional components are to be disabled, a functional component closer to the RF circuit can be disabled. That is, when two or more functional components are selected as target functional components, at least one of the target functional components has an interference intensity greater than each functional component remaining in the second component set, and at least one of the target functional components has a distance to the RF circuit shorter than each functional component remaining in the second component set.

At block 104, a target functional component with an interference value meeting a preset condition is determined from the first component set, and the target functional component is disabled.

In practice, some of the functional components in the operating status are currently used by the user. Therefore, these functional components need to remain in the operating status, and the target functional component is selected from other functional components.

The target functional component with the interference value meeting the preset condition can be determined from the first component set as follows.

A functional component associated with an application running in a foreground is determined from the first component set. A second component set is obtained by deleting the associated functional component from the first component set. A preset number of target functional components are selected from the second component set in descending order of interference values, where each of the preset number of target functional components has an interference value greater than each functional component left in the second component set.

For example, a camera module is currently used by a user to make a video call to another user via data traffic. In this case, no matter whether the interference of the camera module to the RF circuit is strong or weak, the camera will not be turned off.

In an example, the target functional component selected is disabled, for reducing signal interference of the functional component to the RF circuit.

Figure 3:
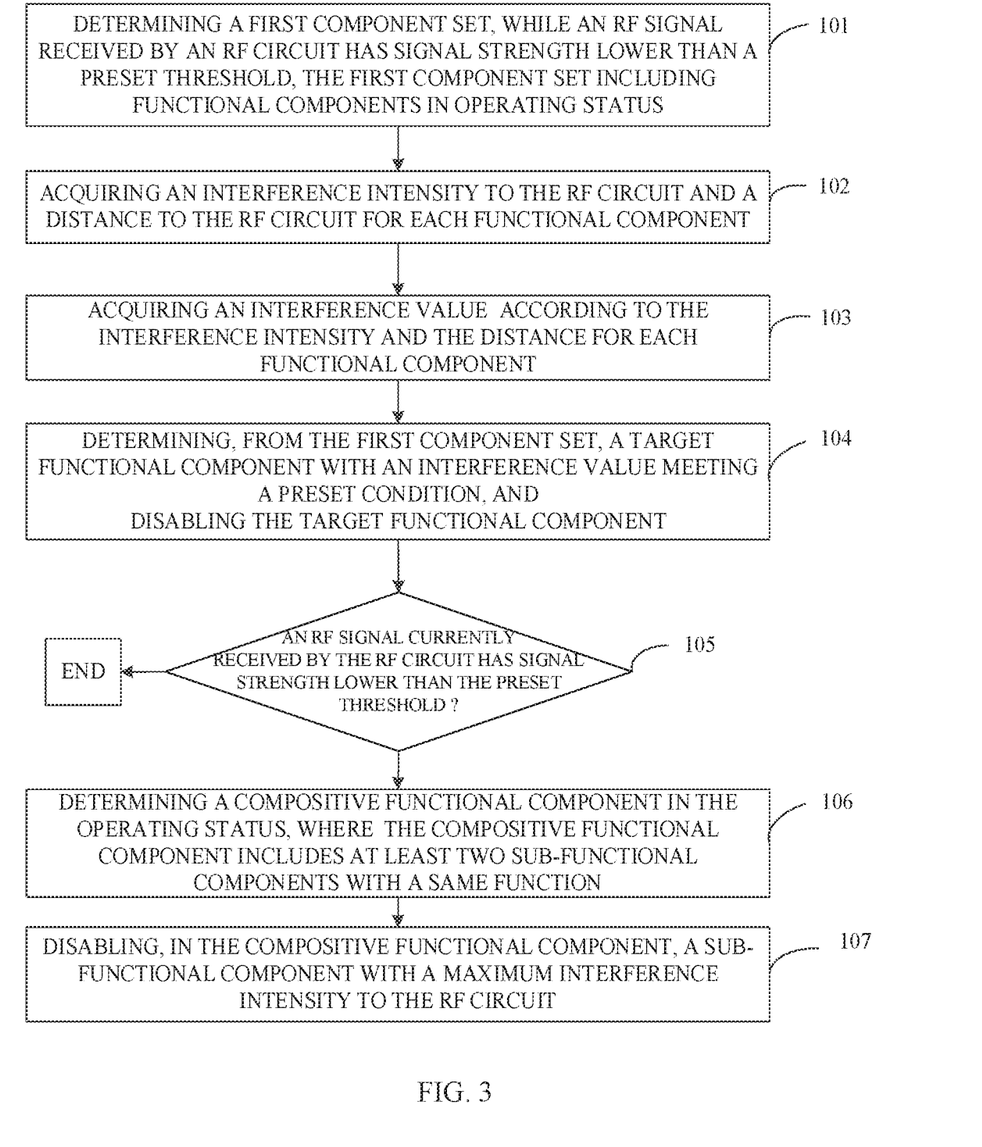
FIG. 3 is a schematic flow chart illustrating a method for processing RF interference according to another implementation of the present disclosure.

In some implementations, the method for processing RF interference may be further described on the basis of the method for processing RF interference described above. Referring to FIG. 3, after the target functional component is disabled, the following is further performed.

At block 105, detect whether an RF signal currently received by the RF circuit has signal strength lower than the preset threshold. If yes, proceed to operations at block 106. If no, end the procedure.

The preset threshold refers to the preset threshold at block 101. Similarly, the signal strength of the RF signal currently received can be acquired by querying working parameters of the RF circuit. Thereafter, the signal strength acquired is compared with the preset threshold to determine whether the signal strength is lower than a preset threshold.

At block 106, a compositive functional component in the operating status is determined, where the compositive functional component includes at least two sub-functional components with a same function.

The compositive functional component may be a functional component such as a dual camera, a dual microphone, a dual flash, and the like. For example, the dual camera includes a long-focus camera and a short-focus camera. The compositive functional component can be determined from the functional components in the operating status according to configuration information of each functional component.

At block 107, a sub-functional component with a maximum interference intensity to the RF circuit in the compositive functional component is disabled.

For each of the sub-functional component in the compositive functional component, an interference intensity to the RF circuit can be determined. Then, compare each sub-functional in terms of the interference intensity to determine a sub-functional component with a maximum interference intensity value. The sub-functional component with the maximum interference intensity value is disabled. In this way, basic functions of the compositive functional component can be maintained while the signal interference to the RF circuit can be reduced.

For example, a dual camera is currently used by a user to make a video call to another user via data traffic and it is detected that an RF signal currently received by the RF circuit has signal strength lower than the preset threshold. In this case, one sub-camera with a maximum interference intensity to the RF circuit in the dual camera is disabled, and the other sub-camera will remain in operating status to maintain normal functions of video call.

According to the method for processing RF interference of implementations of the present disclosure, the first component set is determined while the RF signal received by the RF circuit has signal strength lower than the preset threshold, where the first component set includes functional components in operating status. For each functional component, the interference intensity to the RF circuit and the distance to the RF circuit are acquired, and for each functional component, the interference value is acquired according to the interference intensity and the distance. The target functional component with the interference value meeting the preset condition is determined from the first component set. The target functional component is disabled. This solution reduces interference of functional components to the RF circuit by disabling functional components interfering with the RF circuit, thereby improving strength of a signal received and the stability of the terminal.

Implementations of the present disclosure further provide an apparatus for processing RF interference 200, which can be integrated in a terminal. The terminal may be a device such as a smart phone or a tablet computer, and the like.

Figure 4:
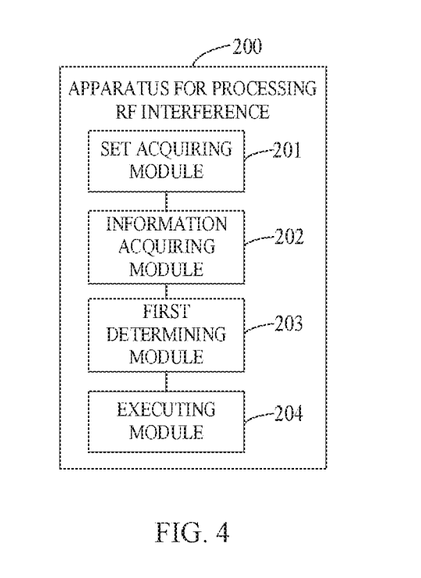
FIG. 4 is a schematic structural diagram illustrating an apparatus for processing RF interference according to an implementation of the present disclosure.

As illustrated in FIG. 4, the apparatus for processing RF interference 200 may include a set acquiring module 201, an information acquiring module 202, a first determining module 203, and an executing module 204.

The set acquiring module 201 is configured to determine a first component set while an RF signal received by an RF circuit has signal strength lower than a preset threshold, where the first component set includes functional components in operating status. The information acquiring module 202 is configured to acquire an interference intensity to the RF circuit and a distance to the RF circuit for each functional component. The first determining module 203 is configured to acquire an interference value according to the interference intensity and the distance for each functional component. The executing module 204 is configured to determine a target functional component with an interference value meeting a preset condition from the first component set, and to disable the target functional component.

In some implementations, the information acquiring module 202 is configured to: for each functional component, determine a channel currently occupied by the RF signal, acquire the interference intensity to the RF circuit in the channel, acquire internal layout information of a terminal, and acquire the distance to the RF circuit according to the internal layout information.

In some implementations, the first determining module 203 is configured to: for each functional component, acquire a first weight value corresponding to the interference intensity and a second weight value corresponding to the distance, acquire a weighted parameter according to the interference intensity and the first weight value corresponding to the interference intensity as well as the distance and the second weight value corresponding to the distance, and acquire the interference value according to the weighted parameter.

In some implementations, the executing module 204 is configured to: determine a functional component associated with an application running in a foreground from the first component set; obtain a second component set by deleting the associated functional component from the first component set; and select a preset number of target functional components from the second component set in descending order of interference values, where each of the preset number of target functional components has an interference value greater than each unselected functional component in the second component set.

In some implementations, when there are at least two target functional components, at least one of the target functional components has an interference intensity greater than each functional component left in the second component set, and at least one of the target functional components has a distance to the RF circuit shorter than each functional component left in the second component set.

Figure 5:
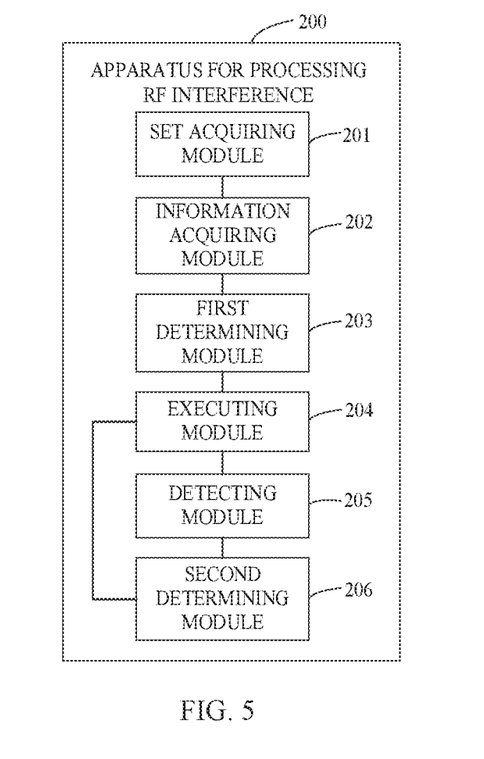
FIG. 5 is a schematic structural diagram illustrating an apparatus for processing RF interference according to another implementation of the present disclosure.

Referring to FIG. 5, in some implementations, the apparatus for processing RF interference 200 further includes a detecting module 205 and a second determining module 206.

The detecting module 205 is configured to detect whether an RF signal currently received by the RF circuit has signal strength lower than the preset threshold. The second determining module 206 is configured to determine a compositive functional component in the operating status upon the detecting module 205 detecting that the RF signal currently received by the RF circuit has signal strength lower than the preset threshold. The compositive functional component includes at least two sub-functional components with a same function. The executing module 204 is further configured to disable a sub-functional component with a maximum interference intensity to the RF circuit in the compositive functional component.

According to the apparatus for processing RF interference of the implementations of the present disclosure, the first component set is determined while the RF signal received by the RF circuit has signal strength lower than the preset threshold, where the first component set includes functional components in operating status. For each functional component, the interference intensity to the RF circuit and the distance to the RF circuit are acquired, and the interference value is acquired according to the interference intensity and the distance. The target functional component with the interference value meeting the preset condition is determined from the first component set. The target functional component is disabled. This solution reduces interference of functional components to the RF circuit by disabling functional components interfering with the RF circuit, thereby improving strength of a signal received and the stability of the terminal.

Implementations of the present disclosure provide an electronic device. The electronic device may be a terminal device such as a smart phone or a tablet computer.

Figure 6:
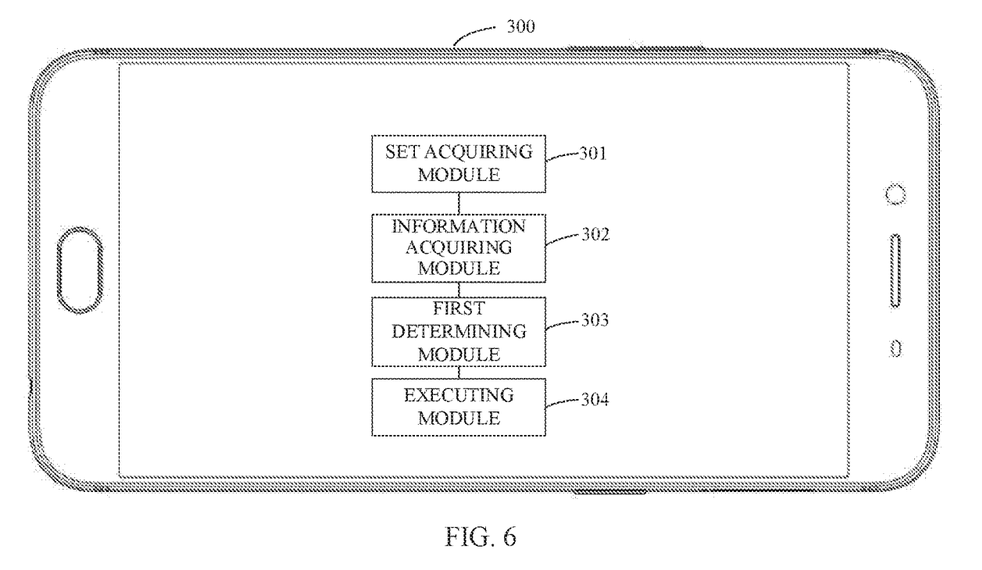
FIG. 6 is a schematic structural diagram illustrating an electronic device according to an implementation of the present disclosure.

As illustrated in FIG. 6, the electronic device 300 includes a set acquiring module 301, an information acquiring module 302, a first determining module 303, and an executing module 304.

The set acquiring module 301 is configured to determine a first component set while an RF signal received by an RF circuit has signal strength lower than a preset threshold, where the first component set includes functional components in operating status. The information acquiring module 302 is configured to acquire an interference intensity to the RF circuit and a distance to the RF circuit for each functional component. The first determining module 303 is configured to acquire an interference value according to the interference intensity and the distance for each functional component. The executing module 304 is configured to determine a target functional component with an interference value meeting a preset condition from the first component set, and to disable the target functional component.

In some implementations, the information acquiring module 302 is configured to: for each functional component, determine a channel currently occupied by the RF signal, acquire the interference intensity to the RF circuit in the channel, acquire internal layout information of a terminal, and acquire the distance to the RF circuit according to the internal layout information.

In some implementations, the first determining module 303 is configured to: for each functional component, acquire a first weight value corresponding to the interference intensity and a second weight value corresponding to the distance, acquire a weighted parameter according to the interference intensity and the first weight value corresponding to the interference intensity as well as the distance and the second weight value corresponding to the distance, and acquire the interference value according to the weighted parameter.

In some implementations, the executing module 304 is configured to: determine a functional component associated with an application running in a foreground from the first component set, obtain a second component set by deleting the associated functional component from the first component set, and select a preset number of target functional components from the second component set in descending order of interference values, where each of the preset number of target functional components has an interference value greater than each unselected functional component in the second component set.

In some implementations, the electronic device 300 further includes a detecting module and a second determining module.

The detecting module is configured to detect whether an RF signal currently received by the RF circuit has signal strength lower than the preset threshold. The second determining module is configured to determine a compositive functional component in the operating status upon the detecting module detecting that the RF signal currently received by the RF circuit has signal strength lower than the preset threshold, where the compositive functional component includes at least two sub-functional components with a same function. The executing module is further configured to disable a sub-functional component with a maximum interference intensity to the RF circuit in the compositive functional component.

According to the electronic device of the implementations of the present disclosure, the first component set is determined while the RF signal received by the RF circuit has signal strength lower than the preset threshold, where the first component set includes functional components in operating status. For each functional component, the interference intensity to the RF circuit and the distance to the RF circuit are acquired, and the interference value is acquired according to the interference intensity and the distance. The target functional component with the interference value meeting the preset condition is determined from the first component set. The target functional component is disabled. This solution reduces interference of functional components to the RF circuit by disabling a functional component interfering with the RF circuit, thereby improving strength of a signal received and the stability of the electronic device.

Implementations of the present disclosure provide an electronic device. The electronic device includes a radio frequency (RF) circuit, a processor, a control circuit, and multiple functional components. For detailed structure, reference can be made to FIG. 8.

Figure 8:
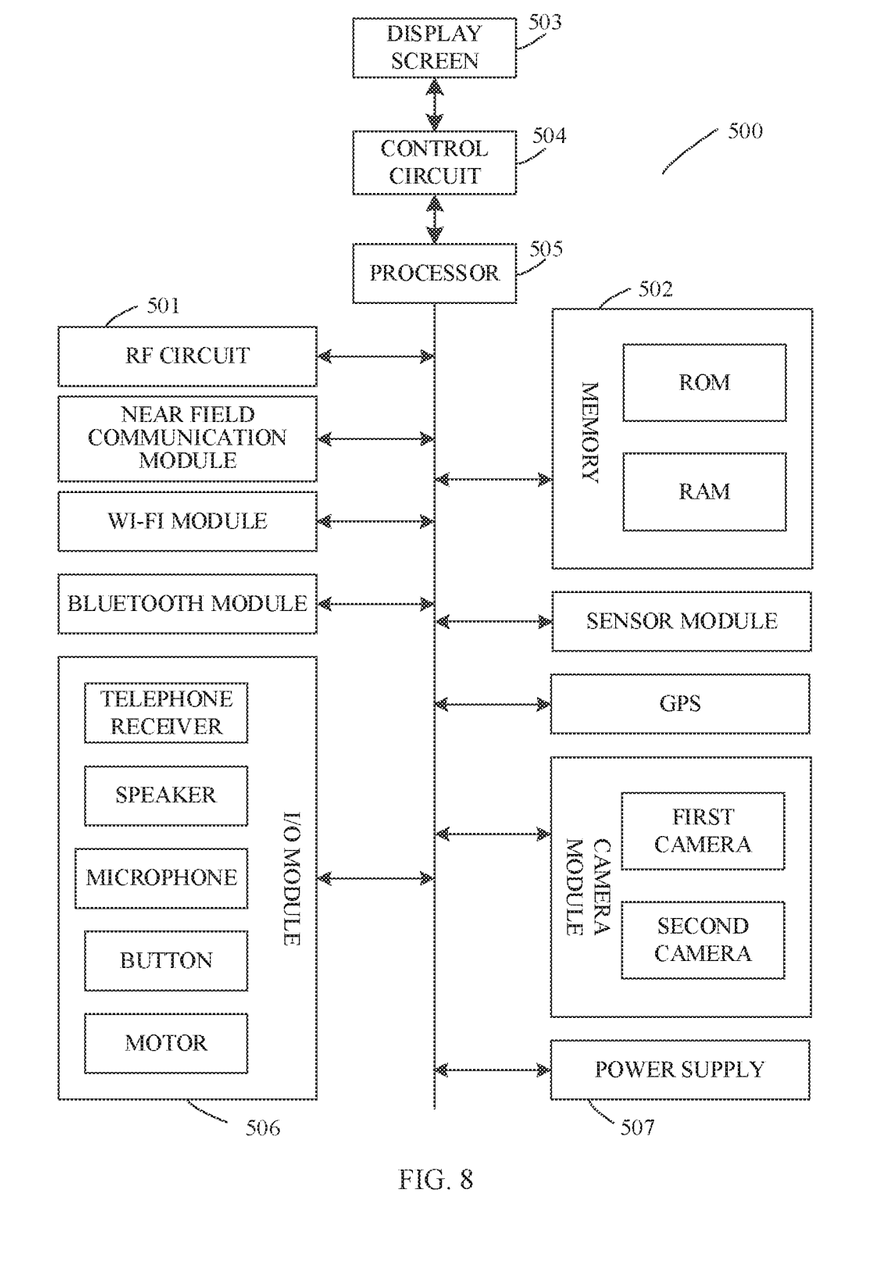
FIG. 8 is a schematic structural diagram illustrating an electronic device according to another implementation of the present disclosure.

The RF circuit is configured to emit and receive an RF signal. The multiple functional components are disposed in the electronic device. The control circuit is configured to control the RF circuit to receive the RF signal and acquire signal strength of the RF signal. The processor is coupled with the RF circuit, the control circuit, and the multiple functional components and configured to: determine, from the multiple functional components, functional components in operating status as a first component set, when the signal strength is lower than a preset threshold; for each functional component in the operating status, acquire an interference intensity to the RF circuit and a distance to the RF circuit, and for each functional component in the operating status, acquire an interference value according to the interference intensity and the distance; and control the control circuit to disable a target functional component, where the target functional component is determined from the first component set and has an interference value meeting a preset condition.

In an implementation, the control circuit configured to control the RF circuit to acquire the signal strength of the RF signal is configured to: query a working parameter of the RF circuit; and acquire the signal strength of the RF signal according to the working parameter.

In an implementation, the processor configured to, for each functional component in the operating status, acquire the interference intensity to the RF circuit is configured to: determine a channel currently occupied by the RF signal; acquire a working frequency of the functional component in the operating status and a frequency point corresponding to the channel; and acquire, according to a result of comparing the working frequency with the frequency point, the interference intensity to the RF circuit in the channel.

In an implementation, the processor configured to, for each functional component in the operating status, acquire the distance to the RF circuit is configured to: acquire internal layout information of a terminal; and acquire, according to the internal layout information, the distance to the RF circuit.

In an implementation, the processor configured to, for each functional component in the operating status, acquire the interference value according to the interference intensity and the distance is configured to: acquire a first weight value corresponding to the interference intensity and a second weight value corresponding to the distance; acquire a weighted parameter, according to the interference intensity and the first weight value corresponding to the interference intensity as well as the distance and the second weight value corresponding to the distance; and acquire, according to the weighted parameter, the interference value.

In an implementation, the processor configured to acquire the first weight value corresponding to the interference intensity and the second weight value corresponding to the distance is configured to: determine, from a plurality of sample intensity intervals, a target intensity interval that the interference intensity falls into; acquire an intensity level corresponding to the target intensity interval; acquire the first weight value corresponding to the intensity level; determine, from a plurality of sample distance intervals, a target distance interval that the distance falls into; acquire a distance level corresponding to the target distance interval; and acquire the second weight value corresponding to the distance level.

In an implementation, the processor is further configured to: determine, from the first component set, a functional component associated with an application running in a foreground; obtain a second component set by deleting the associated functional component from the first component set; and select, from the second component set, in descending order of interference values, a preset number of target functional components, wherein each of the preset number of target functional components has an interference value greater than each unselected functional component in the second component set.

In an implementation, after the control circuit is controlled to disable the target functional component, the processor is further configured to: detect whether an RF signal currently received by the RF circuit has signal strength lower than the preset threshold; determine a compositive functional component in the operating status, while the RF signal currently received by the RF circuit has signal strength lower than the preset threshold, wherein the compositive functional component comprises at least two sub-functional components with a same function; and disable, in the compositive functional component, a sub-functional component with a maximum interference intensity to the RF circuit.

In an implementation, the processor configured to disable, in the compositive functional component, the sub-functional component with the maximum interference intensity to the RF circuit is configured to: acquire, for each sub-functional component in the compositive functional component, an interference intensity to the RF circuit; select, from the interference intensities of all sub-functional components, a target interference intensity with a maximum interference intensity value; determine a target sub-functional component corresponding to the target interference intensity; and disable the target sub-functional component.

In an implementation, the processor configured to determine the compositive functional component in the operating status is configured to: acquire configuration information of the plurality of functional components; determine, from the plurality of functional components, compositive functional components, according to the configuration information; detect whether the compositive functional components are in the operating status; and determine a compositive functional component that is in the operating status as the compositive functional component in the operating status.

Implementations of the present disclosure further provide a storage medium. The storage medium is configured to store instructions for a processor to load to perform the method for processing RF interferences above.

Figure 7:
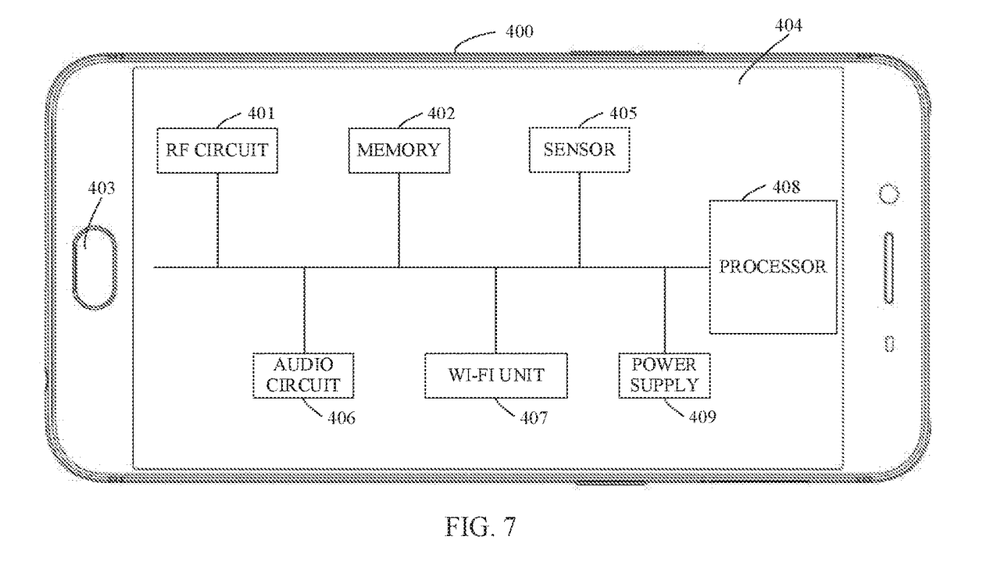
FIG. 7 is a schematic structural diagram illustrating an electronic device according to another implementation of the present disclosure.

In an implementation of the present disclosure, another electronic device is provided. As illustrated in FIG. 7, the electronic device 400 may include an RF circuit 401, a memory 402 including one or more computer-readable storage medium, an input unit 403, a display unit 404, a sensor 405, an audio circuit 406, a wireless fidelity (Wi-Fi) unit 407, a processor 408 including one or more processing cores, a power supply 409, and other components. It will be understood by those skilled in the art that the structure of the electronic device illustrated in FIG. 7 does not constitute a limitation to the electronic device. Compared to the drawing illustrated, more or fewer components may be included, and a combination of some components or different component arrangements may also be possible.

The RF circuit 401 may be configured to communicate with a network device or other electronic devices through wireless communication, so as to perform information transmission with the network device or other electronic devices. Specifically, after downlink information of a base station is received, the downlink information is processed by one or more processors 408. In addition, data related to uplink is transmitted to the base station.

The memory 402 may be configured to store applications and data. The applications stored in the memory 402 contain executable program codes. The applications may constitute various functional components. The processor 408 may execute various functional applications and data processing by running the applications stored in the memory 402.

The input unit 403 may be configured to receive input numeric information, character information, or user feature information (such as a fingerprint), and to generate a keyboard, a mouse, a joystick, an optical or trackball signal input related to user settings and function control. The input unit 403 may include a fingerprint recognition module.

The display unit 404 may be configured to display information input by a user or information provided to the user, and various graphical user interfaces of the electronic device. These graphical user interfaces may be composed of graphics, texts, icons, videos, and any combination thereof.

The electronic device 400 may also include at least one sensor 405, such as a light sensor, a motion sensor, and other sensors.

The audio circuit 406 may provide an audio interface between the user and the electronic device via a speaker or a microphone.

Wireless Fidelity (Wi-Fi) is a type of short range wireless transmission technology. The electronic device can facilitates email transmission, web browsing, streaming media access, and the like with the Wi-Fi unit 407, which provides the user with wireless broadband internet access. Although FIG. 6 illustrates the Wi-Fi unit 407, it can be understood that the Wi-Fi unit 407 is not an essential configuration of the electronic device, and may be omitted as needed without changing the scope of the essence of the disclosure.

The processor 408 is a control center of the electronic device, and respective components in the electronic device may be coupled to the processor 408 via various interfaces and circuits. The processor 408 may perform various functions of the electronic device and process data by running or executing the applications stored in the memory 402 and invoking data stored in the memory 402, thereby performing the whole monitoring on the electronic device.

The terminal also includes a power supply 409 (such as a battery) that supplies power to respective components.

Although not illustrated in FIG. 7, the electronic device 400 may further include a camera, a Bluetooth, a motor, a telephone receiver, and the like, and details are not described herein.

In an implementation of the present disclosure, the processor 408 in the electronic device 400 may load the executable program codes corresponding to processes of one or more applications into the memory 402 according to the following instructions, and the processor 408 may execute the applications stored in the memory 402 to realize various following functions described below.

A first component set is determined while an RF signal received by an RF circuit has signal strength lower than a preset threshold, where the first component set includes functional components in operating status. For each functional component, an interference intensity to the RF circuit and a distance to the RF circuit are acquired, and an interference value is acquired according to the interference intensity and the distance. A target functional component with an interference value meeting a preset condition is determined from the first component set. The target functional component is disabled.

In some implementations, the processor 408 is configured to determine a channel currently occupied by the RF signal and acquire the interference intensity to the RF circuit in the channel for each functional component.

In some implementations, in terms of acquiring the interference intensity to the RF circuit in the channel for each functional component, the processor 408 is configured to acquire a working frequency of the functional component and a frequency point corresponding to the channel, compare the working frequency with the frequency point to obtain a comparison result, and acquire the interference intensity to the RF circuit in the channel according to the comparison result.

In some implementations, the processor 408 is configured to acquire internal layout information of a terminal, and to acquire the distance to the RF circuit according to the internal layout information.

In some implementations, the processor 408 is configured to: for each functional component, acquire a first weight value corresponding to the interference intensity and a second weight value corresponding to the distance, acquire a weighted parameter according to the interference intensity and the first weight value corresponding to the interference intensity as well as the distance and the second weight value corresponding to the distance, and acquire the interference value according to the weighted parameter.

In some implementations, in terms of acquiring the first weight value corresponding to the interference intensity and the second weight value corresponding to the distance, the processor 408 is configured to: determine a target intensity interval that the interference intensity falls into from multiple sample intensity intervals, acquire an intensity level corresponding to the target intensity interval, acquire the first weight value corresponding to the intensity level, determine a target distance interval that the distance falls into from multiple sample distance interval, acquire a distance level corresponding to the target distance interval, and acquire the second weight value corresponding to the distance level.

In some implementations, the processor 408 is configured to: determine a functional component associated with an application running in a foreground from the first component set, obtain a second component set by excluding the associated functional component from the first component set, and select a preset number of target functional components from the second component set in descending order of interference values, where each of the preset number of target functional components has an interference value greater than each unselected functional component in the second component set.

In some implementations, after the target functional component is disabled, the processor 408 is further configured to: detect whether an RF signal currently received by the RF circuit has signal strength lower than the preset threshold, determine a compositive functional component in the operating status while the RF signal currently received by the RF circuit has signal strength lower than the preset threshold, where the compositive functional component includes at least two sub-functional components with a same function, and disable a sub-functional component with a maximum interference intensity to the RF circuit in the compositive functional component.

In some implementations, in terms of disabling the sub-functional component with the maximum interference intensity to the RF circuit in the compositive functional component, the processor 408 is configured to: acquire an interference intensity to the RF circuit for each sub-functional component in the compositive functional component, compare interference intensities to the RF circuit for all sub-functional components, select a target interference intensity with a maximum interference intensity value from the interference intensities of all sub-functional components, determine a target sub-functional component corresponding to the target interference intensity, and disable the target sub-functional component.

In the implementations mentioned above, the descriptions of the various implementations have their own emphasis, and parts not illustrated in detail in some implementations can be referred to foregoing detailed descriptions of the method for processing RF interferences, which are not described herein.

According to the electronic device of the implementations of the present disclosure, the first component set is determined upon detecting that the RF signal received by the RF circuit has signal strength lower than the preset threshold, where the first component set includes functional components in operating status. For each functional component, the interference intensity to the RF circuit and the distance to the RF circuit are acquired, and the interference value is acquired according to the interference intensity and the distance. The target functional component with the interference value meeting the preset condition is determined from the first component set. The target functional component is disabled. This solution reduces interference of functional components to the RF circuit by disabling functional components interfering with the RF circuit, thereby improving strength of a signal received and the stability of the electronic device.

In an implementation of the present disclosure, another electronic device is provided. As illustrated in FIG. 8, the electronic device 500 includes an RF circuit 501, a memory 502, a display screen 503, a control circuit 504, a processor 505, an input/output (I/O) device 506, and a power supply 507. The RF circuit 501, the memory 502, the display screen 503, the control circuit 504, and the I/O device 506 are electrically coupled with the processor 505.

Those skilled in the art will understand that the structure of the electronic device 500 illustrated in FIG. 8 does not constitute a limitation to the electronic device 500. The electronic device 500 may include more or fewer components than illustrated, and a combination of some components or different component arrangements may also be possible.

The RF circuit 501 can communicate with a network device (for example, a server) or other electronic device (for example, a smart phone) via a wireless network to achieve information transmission with the network device or other electronic device. During communication with other devices, the RF circuit 501 can acquire a parameter such as a communication channel, a strength of a communication signal, a timing of a communication signal, and the like, and the parameter acquired is processed by the processor 505. The RF circuit 501 can acquire a receiving timing of a received signal in response to detecting an incoming call, and transmit the receiving timing to the processor 505 for processing.

The memory 502 can be configured to store applications and data. The applications stored in the memory 502 contain executable program codes. The applications may constitute various functional components. The processor 505 executes various functional applications and data processing by running the applications stored in the memory 502.

The display screen 503 may be configured to display information input by a user to the electronic device 500 or information provided to the user, and various graphical user interfaces of the electronic device 500. These graphical user interfaces may be composed of graphics, text, icons, videos, and any combination thereof.

The control circuit 504 is configured to control the display screen 503 to display information.

The processor 505 is the control center of electronic device 500. The processor 505 is coupled with various components of the electronic device 500 via various interfaces and circuits. The processor is configured to perform various functions and processes of the electronic device 500 by running or executing the applications stored in the memory 502, and invoking data stored in the memory 502, thereby performing the whole monitoring on the electronic device 500.

The I/O device 506 is configured to implement various functions, but may also interfere with the reception of the signal by the RF circuit 501. As illustrated in FIG. 5, the I/O device 506 may include a microphone, a telephone receiver, a speaker, a motor, and a button. The I/O device 506 can function as a functional component that interferes with the RF circuit. In addition, the functional components may also include a camera module (for example, a first camera, a second camera, and the like), a Bluetooth module, a Wi-Fi module, a near field communication module, a sensor module, a global positioning system (GPS), and the like.

The power supply 507 is configured to supplies power to respective components of electronic device 500. In some implementations, the power supply 507 can be logically coupled with the processor 505 via a power management system to implement functions such as charging management, discharging management, and power management with the aid of the power management system.

It should be noted that those skilled in the art can understand that all or part of the operations of the implementations mentioned above can be implemented by associated hardware instructed via programs, and the programs can be stored in a computer readable storage medium. The storage medium may include a read only memory (ROM), a random access memory (RAM), a magnetic disk or an optical disk, and the like.

The method for processing RF interference and the electronic device provided in the implementations of the present disclosure are described in detail. The principles and implementations of the present disclosure are described in the specific examples. The description of the above implementations is only used to help the understanding of the method of the present disclosure and its core idea. For those skilled in the art, according to the idea of the present disclosure, there will be changes in specific implementations and the scope of the application. In conclusion, the content of the present disclosure are not to be construed as limiting the application.

What is claimed is:
1. A method for processing radio frequency (RF) interference, comprising:
 determining a first component set, while an RF signal received by an RF circuit has signal strength lower than a preset threshold, the first component set comprising functional components in operating status;

acquiring, for each functional component, an interference intensity to the RF circuit and a distance to the RF circuit;

acquiring, for each functional component, an interference value according to the interference intensity and the distance;

determining, from the first component set, a target functional component with an interference value meeting a preset condition; and disabling the target functional component;

wherein acquiring, for each functional component, the interference value according to the interference intensity and the distance comprises:

acquiring a first weight value corresponding to the interference intensity and a second weight value corresponding to the distance;

acquiring a weighted parameter, according to the interference intensity and the first weight value corresponding to the interference intensity as well as the distance and the second weight value corresponding to the distance; and acquiring, according to the weighted parameter, the interference value.

2. The method of claim 1, wherein for each functional component, acquiring the interference intensity to the RF circuit comprises:

determining a channel currently occupied by the RF signal; and acquiring the interference intensity to the RF circuit in the channel.

3. The method of claim 2, wherein for each functional component, acquiring the interference intensity to the RF circuit in the channel comprises:

acquiring a working frequency of the functional component and a frequency point corresponding to the channel; and acquiring, according to a result of comparing the working frequency with the frequency point, the interference intensity to the RF circuit in the channel.

4. The method of claim 1, wherein for each functional component, acquiring the distance to the RF circuit comprises:

acquiring internal layout information of a terminal; and acquiring, according to the internal layout information, the distance to the RF circuit.

5. The method of claim 1, wherein acquiring the first weight value corresponding to the interference intensity and the second weight value corresponding to the distance comprises:

determining, from a plurality of sample intensity intervals, a target intensity interval that the interference intensity falls into;

acquiring an intensity level corresponding to the target intensity interval;

acquiring the first weight value corresponding to the intensity level;

determining, from a plurality of sample distance intervals, a target distance interval that the distance falls into;

acquiring a distance level corresponding to the target distance interval; and acquiring the second weight value corresponding to the distance level.

6. The method of claim 1, wherein determining, from the first component set, the target functional component with the interference value meeting the preset condition comprises:

determining, from the first component set, a functional component associated with an application running in a foreground;

obtaining a second component set by deleting the associated functional component from the first component set; and selecting, from the second component set, in descending order of interference values, a preset number of target functional components, wherein each of the preset number of target functional components has an interference value greater than each unselected functional component in the second component set.

7. The method of claim 1, further comprising the following after disabling the target functional component:

detecting whether an RF signal currently received by the RF circuit has signal strength lower than the preset threshold;

determining a compositive functional component in the operating status, while the RF signal currently received by the RF circuit has signal strength lower than the preset threshold, wherein the compositive functional component comprises at least two sub-functional components with a same function; and disabling, in the compositive functional component, a sub-functional component with a maximum interference intensity to the RF circuit.

8. The method of claim 7, wherein disabling, in the compositive functional component, the sub-functional component with the maximum interference intensity to the RF circuit comprises:

acquiring, for each sub-functional component in the compositive functional component, an interference intensity to the RF circuit;

selecting, from the interference intensities of all sub-functional components, a target interference intensity with a maximum interference intensity value;

determining a target sub-functional component corresponding to the target interference intensity; and disabling the target sub-functional component.

9. An electronic device, comprising:

a radio frequency (RF) circuit configured to emit and receive an RF signal;

a plurality of functional components disposed in the electronic device;

a control circuit configured to control the RF circuit to receive the RF signal and acquire signal strength of the RF signal; and a processor coupled with the RF circuit, the control circuit, and the plurality of functional components and configured to:

determine, from the plurality of functional components, functional components in operating status as a first component set, while the signal strength is lower than a preset threshold;

acquire, for each functional component in the operating status, an interference intensity to the RF circuit and a distance to the RF circuit, and acquire, for each functional component in the operating status, an interference value according to the interference intensity and the distance; and control the control circuit to disable a target functional component, wherein the target functional component is determined from the first component set and has an interference value meeting a preset condition;

wherein the processor is further configured to:
determine, from the first component set, a functional component associated with an application running in a foreground;
obtain a second component set by deleting the associated functional component from the first component set; and
select, from the second component set, in descending order of interference values, a preset number of target functional components, wherein each of the preset number of target functional components has an interference value greater than each unselected functional component in the second component set.

10. The electronic device of claim 9, wherein the control circuit configured to control the RF circuit to acquire the signal strength of the RF signal is configured to:
query a working parameter of the RF circuit; and
acquire the signal strength of the RF signal according to the working parameter.

11. The electronic device of claim 9, wherein the processor configured to, for each functional component in the operating status, acquire the interference intensity to the RF circuit is configured to:
determine a channel currently occupied by the RF signal;
acquire a working frequency of the functional component in the operating status and a frequency point corresponding to the channel; and
acquire, according to a result of comparing the working frequency with the frequency point, the interference intensity to the RF circuit in the channel.

12. The electronic device of claim 9, wherein the processor configured to, for each functional component in the operating status, acquire the distance to the RF circuit is configured to:
acquire internal layout information of a terminal; and
acquire, according to the internal layout information, the distance to the RF circuit.

13. The electronic device of claim 9, wherein the processor configured to, for each functional component in the operating status, acquire the interference value according to the interference intensity and the distance is configured to:
acquire a first weight value corresponding to the interference intensity and a second weight value corresponding to the distance;
acquire a weighted parameter, according to the interference intensity and the first weight value corresponding to the interference intensity as well as the distance and the second weight value corresponding to the distance; and
acquire, according to the weighted parameter, the interference value.

14. The electronic device of claim 13, wherein the processor configured to acquire the first weight value corresponding to the interference intensity and the second weight value corresponding to the distance is configured to:
determine, from a plurality of sample intensity intervals, a target intensity interval that the interference intensity falls into;
acquire an intensity level corresponding to the target intensity interval;
acquire the first weight value corresponding to the intensity level;
determine, from a plurality of sample distance intervals, a target distance interval that the distance falls into;
acquire a distance level corresponding to the target distance interval; and
acquire the second weight value corresponding to the distance level.

15. The electronic device of claim 9, wherein after the control circuit is controlled to disable the target functional component, the processor is further configured to:
detect whether an RF signal currently received by the RF circuit has signal strength lower than the preset threshold;
determine a compositive functional component in the operating status, while the RF signal currently received by the RF circuit has signal strength lower than the preset threshold, wherein the compositive functional component comprises at least two sub-functional components with a same function; and
disable, in the compositive functional component, a sub-functional component with a maximum interference intensity to the RF circuit.

16. The electronic device of claim 15, wherein the processor configured to disable, in the compositive functional component, the sub-functional component with the maximum interference intensity to the RF circuit is configured to:
acquire, for each sub-functional component in the compositive functional component, an interference intensity to the RF circuit;
select, from the interference intensities of all sub-functional components, a target interference intensity with a maximum interference intensity value;
determine a target sub-functional component corresponding to the target interference intensity; and
disable the target sub-functional component.

17. The electronic device of claim 15, wherein the processor configured to determine the compositive functional component in the operating status is configured to:
acquire configuration information of the plurality of functional components;
determine, from the plurality of functional components, compositive functional components, according to the configuration information;
detect whether the compositive functional components are in the operating status; and
determine a compositive functional component that is in the operating status as the compositive functional component in the operating status.

18. An electronic device, comprising:
a radio frequency (RF) circuit;
a memory;
a plurality of functional components;
a control circuit, configured to control the RF circuit to receive an RF signal; and
a processor, coupled with the RF circuit, the memory, the control circuit, and the plurality of functional components and configured to invoke computer programs stored in the memory to:
acquire signal strength of the RF signal;
determine, from the plurality of functional components, functional components in operating status as a first component set, when the signal strength is lower than a preset threshold;
acquire, for each functional component in the operating status, an interference intensity to the RF circuit and a distance to the RF circuit;
acquire, for each functional component in the operating status, an interference value according to the interference intensity and the distance;
determine, from the first component set, a target functional component with an interference value meeting a preset condition; and control the control circuit to disable the target functional component;
detect whether an RF signal currently received by the RF circuit has signal strength lower than the preset threshold;
determine a compositive functional component in the operating status, while the RF signal currently received by the RF circuit has signal strength lower than the preset threshold, wherein the compositive functional component comprises at least two sub-functional components with a same function; and
disable, in the compositive functional component, a sub-functional component with a maximum interference intensity to the RF circuit.

* * * * *